United States Patent [19]

Jantzen et al.

[11] 3,783,200

[45] Jan. 1, 1974

[54] SELF-THREADING MAGNETIC TAPE TRANSPORT AND MAGAZINE

[75] Inventors: Johannes K. Jantzen, Mountain View, Calif.; Robert L. Moore, La Grange, Ill.

[73] Assignee: International Video Corporation, Sunnyvale, Calif.

[22] Filed: Aug. 18, 1971

[21] Appl. No.: 172,649

[52] U.S. Cl. .......... 179/100.2 T, 206/52 F, 242/68.3

[51] Int. Cl. .......... G11b 15/18

[58] Field of Search .......... 179/100.2 T, 100.2 Z; 206/52 F; 242/68.3, 76, 192, 195, 197

[56] References Cited

UNITED STATES PATENTS

| | | | |
|---|---|---|---|
| 3,691,315 | 9/1972 | Ellmore | 179/100.2 T |
| 3,620,475 | 11/1971 | Penn | 242/197 |
| 3,416,150 | 12/1968 | Lindberg, Jr. | 340/174.1 C |
| 3,609,722 | 9/1971 | Zenefilis | 179/100.2 Z |
| 3,488,016 | 1/1970 | Mouissie | 242/197 |
| 3,542,305 | 11/1970 | Feierabend | 242/68.3 |
| 3,606,188 | 9/1971 | Wagner | 242/68.3 |
| 3,598,926 | 8/1971 | Umeda | 179/100.2 T |
| 3,006,650 | 10/1961 | Ellmore | 242/197 |
| 3,623,644 | 11/1971 | Olsen | 179/100.2 Z |
| 3,606,192 | 9/1971 | Goddard | 242/76 |
| 3,454,961 | 7/1969 | Tatter | 242/197 |

*Primary Examiner*—Terrell W. Fears
*Attorney*—Karl A. Limbach et al.

[57] ABSTRACT

A self-threading magnetic tape transport and dust-tight tape magazine for use therewith. When the magazine is in place on the transport, a locking hub/turntable breaks the dust seal and permits the enclosed tape reel to rotate freely within the magazine. Upon giving the load command, an automatic threading procedure is initiated that opens an access door in the magazine, inserts a puck drive wheel to drive the stiff leader on the end of the tape past a stripper arm into a threading path. A spirally grooved sleeve threads the leader around the helical scan assembly. After passing the scanner, the puck is withdrawn and the leader is driven by the capstan. A set of guide arms directs the leader around the slowly rotating take up reel where it is cinched up by friction to complete the automatic threading. Tape cannot leave the magazine if the magazine is improperly installed by the operator due to the configuration of the magazine and transport top cover in conjunction with guide finders and interlocks.

1 Claim, 22 Drawing Figures

INVENTORS
JOHANNES K. JANTZEN
ROBERT L. MOORE
BY Limbach, Limbach & Sutton
ATTORNEYS INVENTORS
JOHANNES K. JANTZEN
ROBERT L. MOORE
BY Limbach, Limbach & Sutton
ATTORNEYS INVENTORS
JOHANNES K. JANTZEN
BY ROBERT L. MOORE
Limbach, Limbach, & Sutton
ATTORNEYS

INVENTORS
JOHANNES K. JANTZEN
BY ROBERT L. MOORE

Limbach, Limbach & Sutton
ATTORNEYS

INVENTORS
JOHANNES K. JANTZEN
BY ROBERT L. MOORE
Limbach, Limbach & Sutton
ATTORNEYS INVENTORS
JOHANNES K. JANTZEN
BY ROBERT L. MOORE
Limbach, Limbach & Sutton
ATTORNEYS INVENTORS
JOHANNES K. JANTZEN
BY ROBERT L. MOORE
Limbach, Limbach & Sutton
ATTORNEYS

INVENTORS
JOHANNES K. JANTZEN
BY ROBERT L. MOORE

Limbach, Limbach & Sutton
ATTORNEYS

INVENTORS
JOHANNES K. JANTZEN
BY ROBERT L. MOORE
Limbach, Limbach & Sutton
ATTORNEYS INVENTORS
JOHANNES K. JANTZEN
BY ROBERT L. MOORE
Limbach, Limbach & Sutton
ATTORNEYS

SELF-THREADING MAGNETIC TAPE TRANSPORT AND MAGAZINE

BACKGROUND OF THE INVENTION

The present invention relates to magnetic tape transports and more particularly to a magnetic tape transport adapted for loading and operation by relatively unskilled operators.

Typical prior art magnetic tape transports capable of handling video or high density data information are complex mechanisms requiring reasonably skilled operators to properly load and thread the tape through the proper tape path. This is particularly true in the case of helical scan recorders which have the added requirement of a proper wrap around a scanning drum. Such transports are unsuitable for use by relatively unskilled non-technically trained office workers, for example.

In order to overcome the requirement for trained operators, the tape transport according to the present invention provides a simple loading procedure with automatic threading of the tape through a helical scanner. Although the invention is particularly useful in a document storage and retrieval system to be operated by office workers, it will be apparent that the invention is equally applicable to a tape transport for home video recording applications where unsophisticated operators will also be encountered. The invention is also useful in sophisticated technical environments where it is desired to free the operator from the laborious chore of threading tape.

It will also be apparent that the present invention may have applications in non-helical scan transports. For example, the dust-tight removable magazine may be usable in quad head or longitudinal head transports.

Other advantages and features of the present invention will become apparent as the specification is read and understood.

SUMMARY OF THE INVENTION

As essentially dust-tight tape magazine is provided containing a standard tape reel (12½ inch diameter, 1 inch wide, for example), with a modified hub to accept compression springs that are required to provide magazine dust seal pressure on both sides when stored vertically or flat. The springs load a dust seal at the hub. A tape exit area is provided by a dust-tight sliding door that is automatically opened during threading and which is held open by a spring latch until the magazine is removed from the transport. A relatively stiff leader is spliced to the outside end of the tape in the magazine. A spring-loaded leader stripper is biased against the leader at all times except during running modes of the transport. The stripper strips leader out of the magazine during threading and spring clamps the leader in storage. The magazine is nonsymmetrical to prevent improper orientation when installed and also has a plurality of guide pin holes to insure proper alignment of the tape transport. An interlock may be provided to prevent recording.

An integral turntable and hub mechanism is provided to accept the magazine. The turntable/hub mounts directly on the magazine reel servo motor shaft. The assembly is operated by flipping down a lever type locking device which breaks the magazine dust seal, clamps the magazine reel, and closes a switch to signal that the lock is closed and ready for tape motion. No key slot is provided in the hub, hence, the magazine reel may be in any position when loaded.

A magazine-side linkage is provided that is driven by a single gear head motor connected to a half revolution crank drive. The linkage assembly opens the slide door in the magazine, engages a puck drive mechanism through the open door to spring load the puck against the outer leader diameter, and aligns the magazine reel tension arm idler to provide a straight threading path. The linkage holds the leader stripper away from the tape after threading is completed. The puck mechanism includes a swinging linkage having a belt drive, that is driven at about 7 inches per second.

A threading sleeve ring is provided around a conventional helical scanner to guide the leader around the scan drums. The self-threading ring is keyed to the ingoing guidepost and to the outgoing guidepost. A spiral slot cut in the interior wall of the threading sleeve guides the stiff leader through the proper path between the ingoing and outgoing guideposts.

A further linkage assembly located on the fixed reel side of the transport is driven by a second gear head motor driving a half revolution crank drive. This assembly drives a set of threading arms toward the fixed reel hub to thread the tape onto the friction sleeve of the hub. The linkage assembly also aligns the fixed reel servo tension idler to provide a straight threading path.

In operation, the magazine is held by both handles and installed on the turntable with the turntable latch in its up position. The turntable latch is closed to simultaneously lock the enclosed reel to the turntable while freeing the enclosed reel from the magazine walls and breaking the magazine dust seals. Proper locking and location of the magazine is confirmed by series interlock switches. A set of clamping fingers hold the magazine in place and these fingers are released only when the tape is ultimately returned to the magazine upon completion of the unload cycle thus preventing removal of the magazine when its tape is threaded.

Upon initiation of the load cycle, the following actions take place. The fixed reel is caused to rotate and the fixed reel tape guide arms move in toward the reel hub. The fixed reel tape and magazine reel tension arms move into alignment with their adjacent guide chutes to permit the leader to be threaded. The capstan is actuated, but the pinch roller remains disengaged. The helical scanner is made to rotate at 2,400 rpm thus causing a bias spring to withdraw the heads from contact with the tape leader being threaded to prevent head damage. The dust-tight magazine door is opened and the puck moves into contact with the tape and begins to drive the edge of the tape pack. The stripper catches the end of the leader and forces it out into the tape channel where a plurality of guide chutes are provided to guide the leader along the desired path in between the operational elements of the transport. When the leading edge of the leader reaches a sensor just beyond the capstan the pinch roller is engaged and the capstan drives the tape through the balance of the cycle. At this point the puck is withdrawn, the stripper is pulled out of contact with the tape, and the magazine reel tension arm is returned to its operating position. As the tape approaches the fixed reel, it is guided toward and around the hub by the guide arms. The reel is conventional with a standard friction ring on the hub, which causes the tape to cinch up after two or three wraps around the fixed reel hub. The capstan continues to control the tape motion until the trailing edge of the leader has passed the capstan sensor, the fixed reel tape guide arms move outside of the reel periphery, the fixed reel tension arm returns to its normal operating position, the pinch roller is disengaged, and the helical scanner speed increases to 3,600 rpm to place the heads at their normal tip projection. At this point the recorder winds the tape to the end of tape marker at full search speed.

To unload the magazine, an unload button is pressed, which will retrieve tape into the magazine. The turntable latch is opened and the magazine is removed by grasping the handles. The magazine will not be released unless the magazine-side lead sense device indicates the leader has passed this position. The magazine container will be held by the fingers until released by the interlock solenoid. The leader stripper will spring tight against the leader and door will spring closed when the magazine is removed from the transport.

DESCRIPTION OF THE PREFERRED EMBODIMENTS

Figure 1:
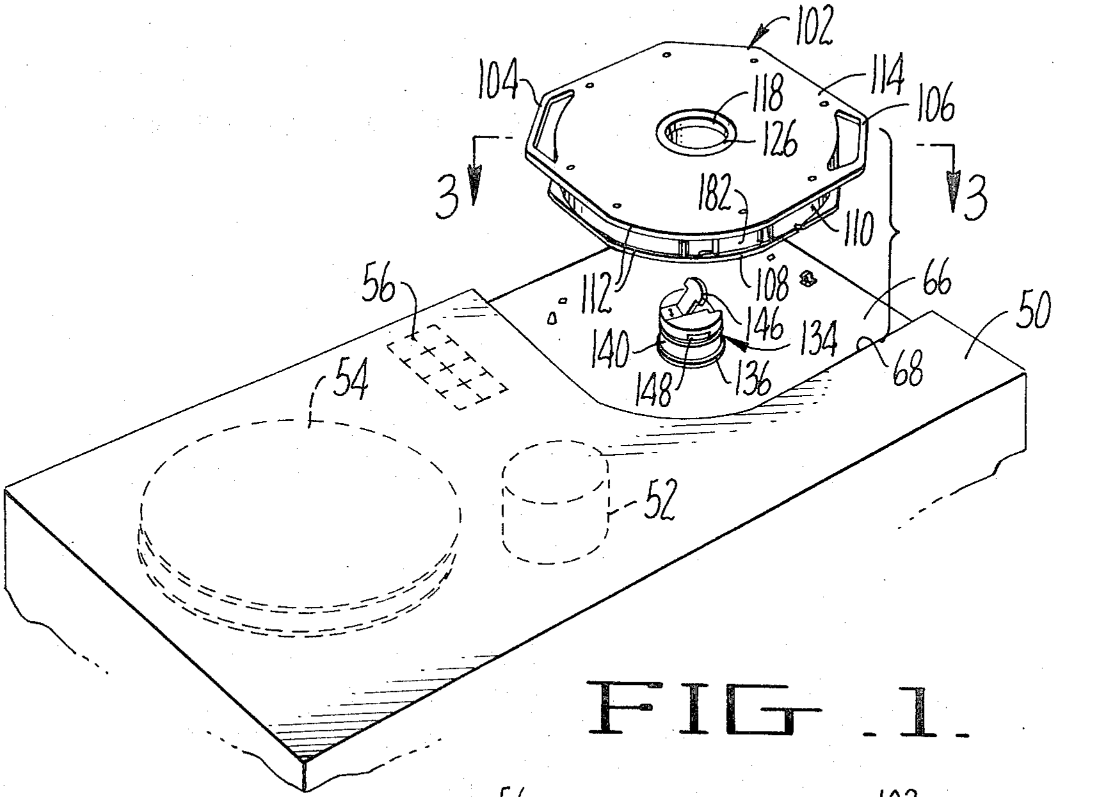
FIG. 1 is an isometric view of the tape transport with its cover member in place and with the magazine exploded from its loaded position.

Throughout the various figures the same reference numerals will be used to denote the same elements so far as practicable.

Figure 2:
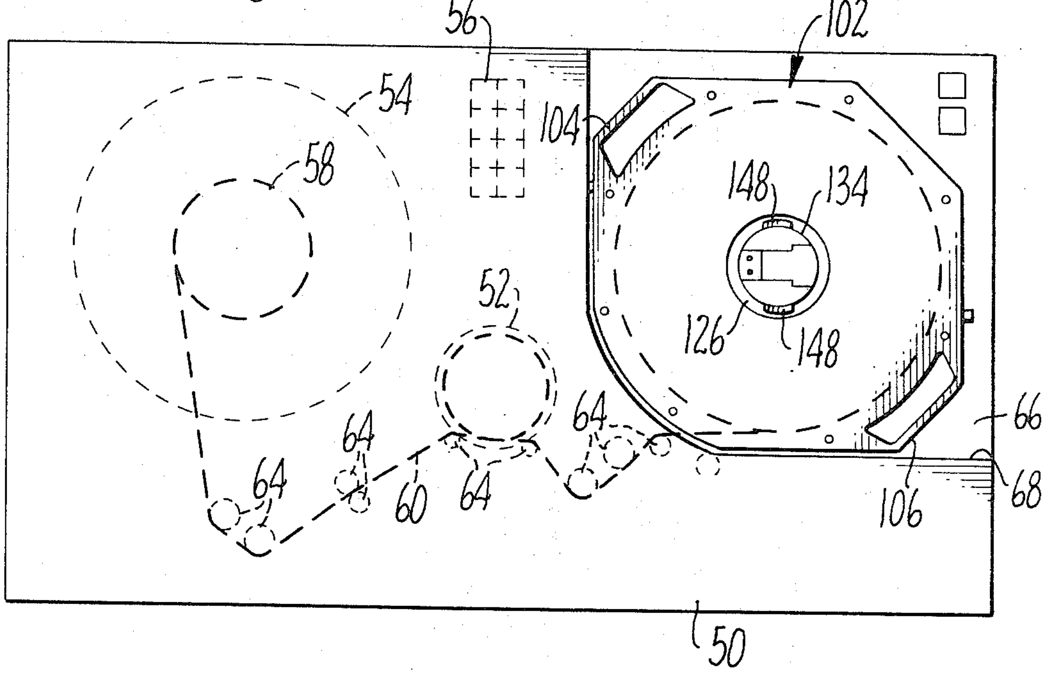
FIG. 2 is a plan view of the tape transport with its cover member and the magazine in place.

Referring now to FIGS. 1 and 2 of the drawings, the general arrangement of the tape transport and magazine are shown. The transport includes a top cover 50 having a turntable/hub assembly mounted at one side thereof on frame 66 in a cut out 68, a centrally located helical scanner assembly 52 below cover 50, and a fixed tape reel 54 located at the other end of the transport below cover 50. Control panels 56, for a service technician located below the cover panel, and 62, for actuation by an operator, are provided. A magazine 102 is provided for mounting on turntable/hub 134. When properly mounted and threaded, the tape from magazine 102 follows a tape path 60 around the helical scanner 52 and the tape guide drive and tension means 64 to the hub 58 of the fixed tape reel 54.

Magazine 102 has a pair of handles 104 and 106 for handling by an operator. The magazine 102 has a bottom plate 108, side walls 110 and a top plate 114. The top and bottom plates extend beyond the side walls to define edge lips 112 that have flat edges for ease of vertical storage. A dust sealing member 126 is provided in the center of magazine 102 adjacent the internal tape reel hub 118.

Magazine assembly 102 is installed over turntable/-hub 134 which has a locking lever arm 146, a central cylindrical portion 140, a pair of extending fingers for breaking the magazine dust sealing member 126 and engaging the magazine reel hub 118 against the turntable platform 136.

Cut out portion 68 in the top cover 50 has a curved side adapted to accept the magazine 102. The magazine does not fit into the cut out when oriented differently or when upside down.

Figures 3, 4, 5:
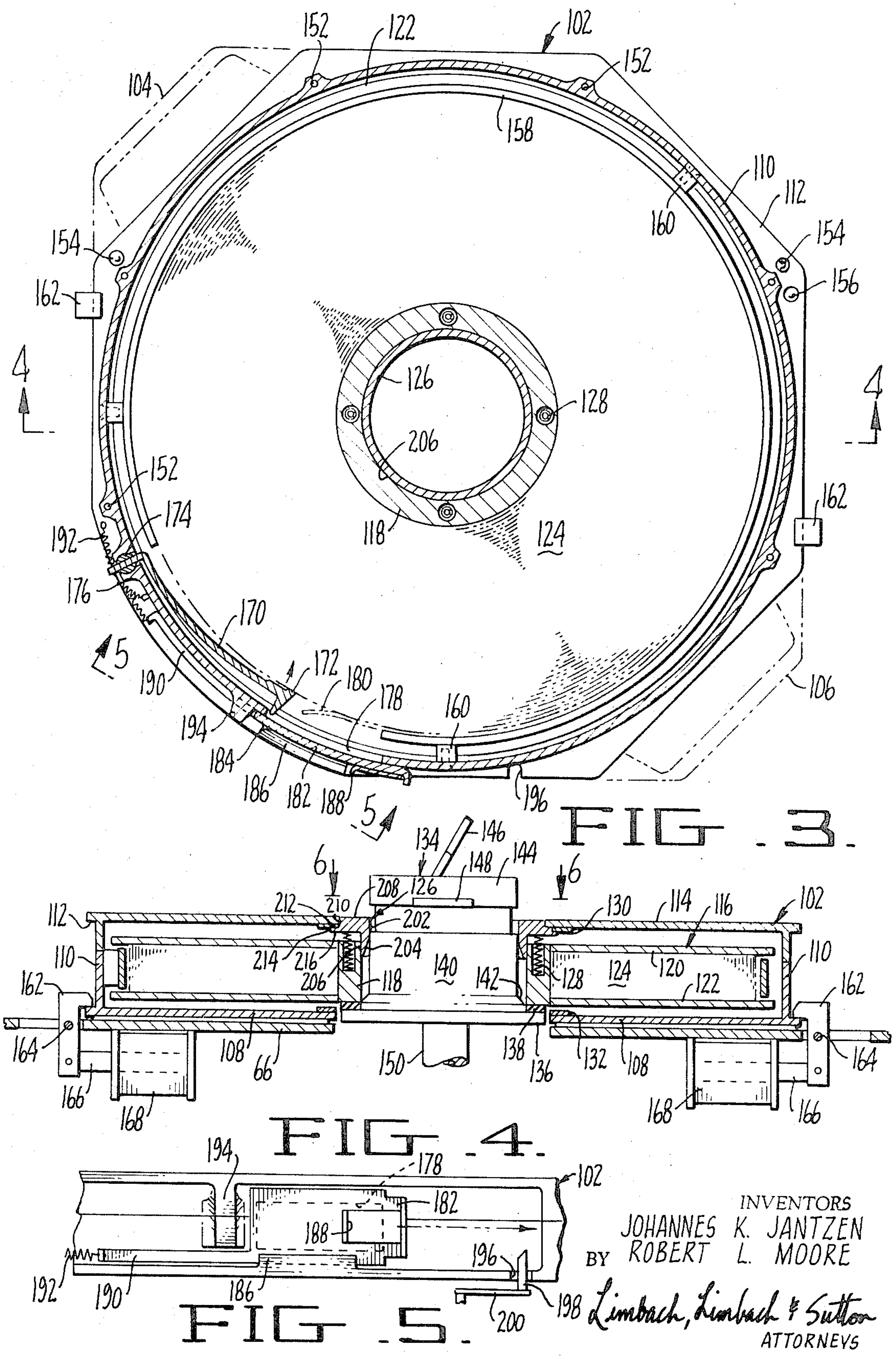
FIG. 3 is a plan section view of the magazine through section lines 3—3 of FIG. 1.
FIG. 4 is an elevational section view of the magazine through section lines 4—4 of FIG. 3.
FIG. 5 is a broken away elevation view along lines 5—5 of FIG. 3.
Figure 6:
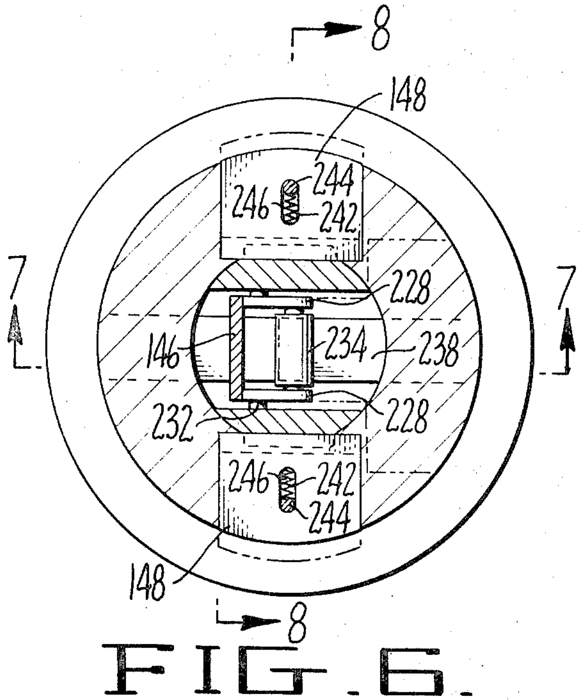
FIG. 6 is a plan section view of the hub/turntable through section lines 6—6 of FIG. 3.
Figure 7:
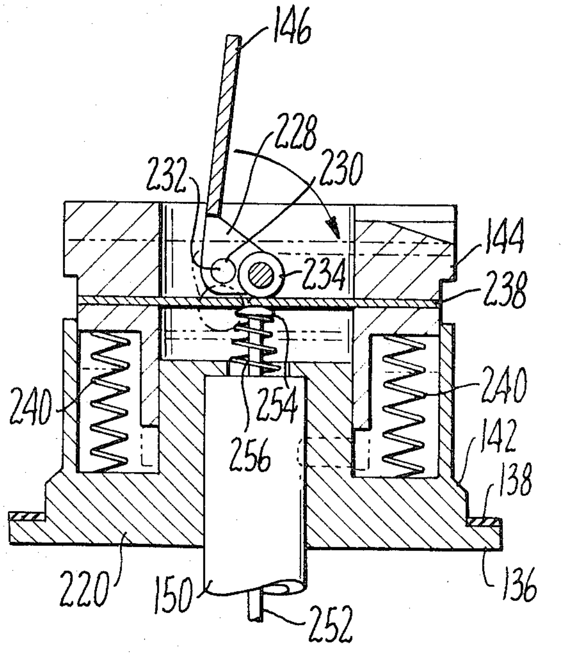
FIG. 7 is an elevation section view of the hub/turntable through section lines 7—7 of FIG. 6.
Figure 8:
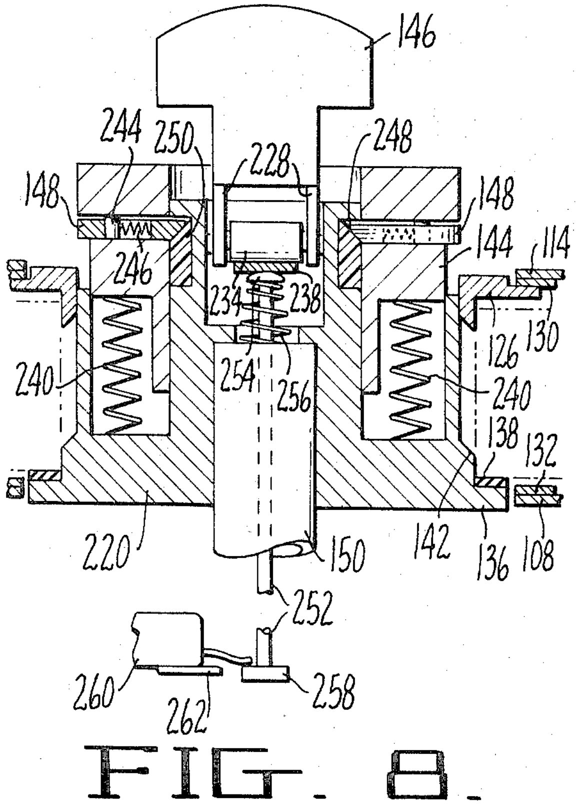
FIG. 8 is an elevation section view of the hub/turntable through section lines 8—8 of FIG. 6.
Figure 9:
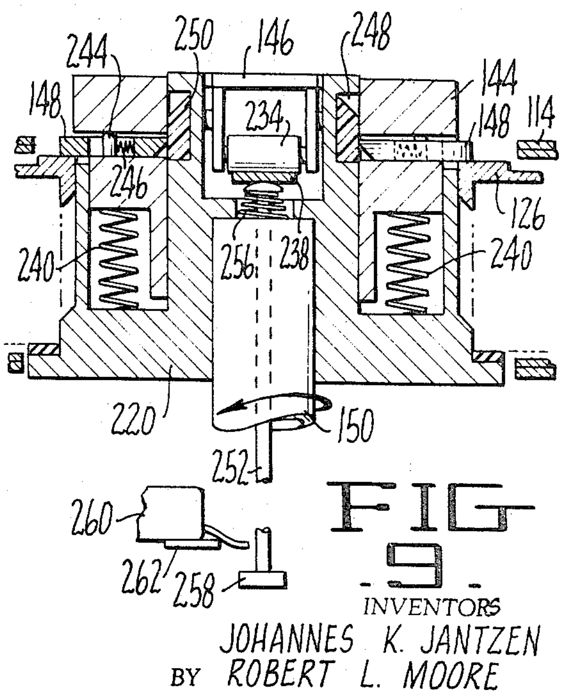
FIG. 9 is a view similar to FIG. 8 but showing the hub/turntable in its locked position.

Further details of magazine assembly 102 are shown in FIGS. 3 through 5. Magazine assembly 102 defines a dust-tight enclosure for storage. Thus, as shown in FIGS. 3 through 5, prior to closing the locking lever arm 146, the magazine is essentially dust-tight. The enclosed conventional tape reel 116, which, for example, may have a diameter of 12½ inches and a width of 1 inch, has a hub 118, a top flange 120, and a bottom flange 122. A quantity of tape 124 is wound around hub 118 between the flanges. A plurality of compression springs are provided in hub 118, these springs provide an upward bias against dust sealing member 126 to cause the member to engage an upper dust seal ring 130, made of felt, for example, that is adjacent the circular cut out portion 115 of the magazine top.

Dust sealing member 126 is generally ring-shaped, having a vertical inner circumferential wall 202 with an outwardly tapered lower portion 204. A vertical outer circumferential wall 206 is machined to fit closely the dimensions of tape reel hub 118. Member 126 has a first upper disc portion 208 having an inner radius dimension to fit closely with the hub/turntable 134 and an outer radius dimensioned to fit closely with the upper plate cut out 115. The outer radius of disc portion 208 slopes along an edge to 210 to a second upper disc portion 212 that engages the dust seal ring 130 of the underside of the magazine top 114. The underside or lower disc portion 216 of dust sealing member 126 is normally biased away from tape reel flange 120 except when the hub/turntable is in its locked position, in which case member 126 is held firmly against the top of hub 118 and flange 120.

A lower dust seal ring 132, which can also be made of felt, for example, is located on the inner wall of magazine bottom 108 adjacent the cut out portion 109. The circular cut outs 109 and 115 have radii chosen slightly larger than the location of the outer wall of reel hub 118. When in position on the transport, lower flange 122 of the tape reel 116 is spaced slightly from the dust seal ring 132. However, in storage the compression springs 128 will urge flange 122 against seal ring 132 while simultaneously urging the dust sealing member 126 against the upper dust seal ring 130. The close fit between the inner radius of hub 118 and the outer circumferential wall 206 of member 126 provide an effective dust seal at the top of the magazine. When in position on the transport, the tape reel hub 118 engages the turntable platform 136 and a flared skirt portion 142 of the central hub 140. A friction surface 138 is provided on the turntable platform 136. When the locking lever arm 146 is flipped downward to its closed position, the top portion 144 of the turntable/hub 134 slides downward and fingers 148 extend to press the dust sealing member 126 downward onto tape reel 116 to firmly engage it against the turntable platform 136. A drive shaft 150 provides drive to the turntable/hub 134 from the magazine reel servo motor (not shown).

Magazine 102 can be formed by casting the bottom plate 112 and the side walls 110 in a single piece. Flared portions of the side walls are provided having holes 152 for securing the magazine top plate 114 that may be cast from a separate piece. A pair of guide pin holes 154 are provided in the bottom edge lips 112. A further hole 156 may be provided as a record interlock. A tape retaining ring having a width approximately that of the tape, but less than the distance between the tape reel flanges is held from the magazine side walls by a plurality of screws and spacers 160. Retaining ring 158 prevents the tape from leaving the confines of the tape reel flanges. A pair of latches 162 are provided to grip the bottom plate lips 112 in order to hold the magazine in place on the transport cover 50 at all times when the tape is unwound from the magazine. Latches 162 are pivoted at points 164 and connected by linkages 166 to latch release solenoids 168.

A tape leader stripper arm 170 having a triangular cross section end 172 designed to engage the tape leader and direct it radially outward is hinged at a pivot point 174 and is normally held against the tape periphery by a spring 176 connected between the tail 177 of stipper arm 170 and a point on the outer side wall of the magazine. A length of tape leader 180 is provided at the end of the tape 124 as is further described hereinafter in connection with FIG. 22. A rectangular access aperture 178 for departure of the tape leader and tape from the magazine is ordinarily sealed by a sliding door 182 that travels in a track 184 defined by a ridge 186. An outward extending ear or catch portion 188 is provided on the sliding door 182 for engagement by an opening mechanism to be described hereinafter. The door has a curved end portion 189 that rides over an upward slanting pin 198 mounted on a leaf spring 200. Thus, when opened, pin 198 holds the door in its open position until the magazine is removed from the transport. Door 182 has an extended tail portion 190 that is attached to a spring 192 that is fastened against the side wall of the magazine. Thus, in the absence of an opening force the door is held in its closed position. Suitable dust sealing material is provided on the inner surface of door 182 adjacent the side wall of the magazine at the opening aperture. The door holding-pin 198 fits through an aperture 196 in the bottom lip of the magazine. A guide ridge portion 194 of the magazine side wall is provided in order to provide further guidance to the tape leader as it is led out of the magazine.

Referring now to FIGS. 6 through 9 wherein the details of hub/turntable assembly 134 are shown. The assembly comprises generally two portions, a fixed lower or base portion 220, which is attached to the drive shaft 150, having the flared turntable portion 136 and flared skirt portion 142 projecting outward from the central cylindrical portion 140. The central portion 140 defines a chamber in which the sliding portion 144 is held. A center part of the base 220 extends upward inside member 144. Locking lever arm 146 is pivoted on a shaft 232 fixed to the upward extending center part of base member 220, that extends through pivot aperture 230 in arms 228 attached to the bottom end of lever 146. A cam roller 234 on shaft 236 held between arms 238 pushes downward on a flexible strip 238 when the lever 146 is rotated downward. Strip 238 deflects a slight amount to provide a heavy clamping pressure. Strip 238 is held securely with top portion 144 and causes portion 144 to move therewith. A set of compression springs between base 220 and moving portion 144 provide an upward bias in the absence of downward locking pressure by cam roller 234. The extending tongues 148 are held horizontally in upper portion 144; each tongue 148 is biased radially inward by a compression spring 242 running in a cut out slot 242 disposed centrally in each tongue. A pin 244 receives one end of the spring 246 and limits movement of the tongues. The inner ends of tongues 148 are angled and fit into a V-cross section neck cut out 248. Thus, as sliding member 144 is forced downward by the cam roller 234, the tongues 148 are pushed radially outward as they are forced to slide along neck cut out 248. Low friction material such as 250 can be provided in the base wall below cut outs 248. Delrin plastic is suitable for this material. As member 144 moves downward it also pushes down a plunger shaft 252 that is normally biased upward by a spring 256 mounted on shaft 252 between a collar 254 at the top of shaft 252 and the top of drive shaft 150. The lower end of shaft 252 has a collar 258 that normally engages the leaf of a microswitch 260. When shaft 252 is moved downward, collar 258 goes out of engagement with the leaf of microswitch 260 and the leaf strikes stop 262. In the latter position the microswitch is closed and provides an indication that the hub/turntable is in its locked position.

Figure 10:
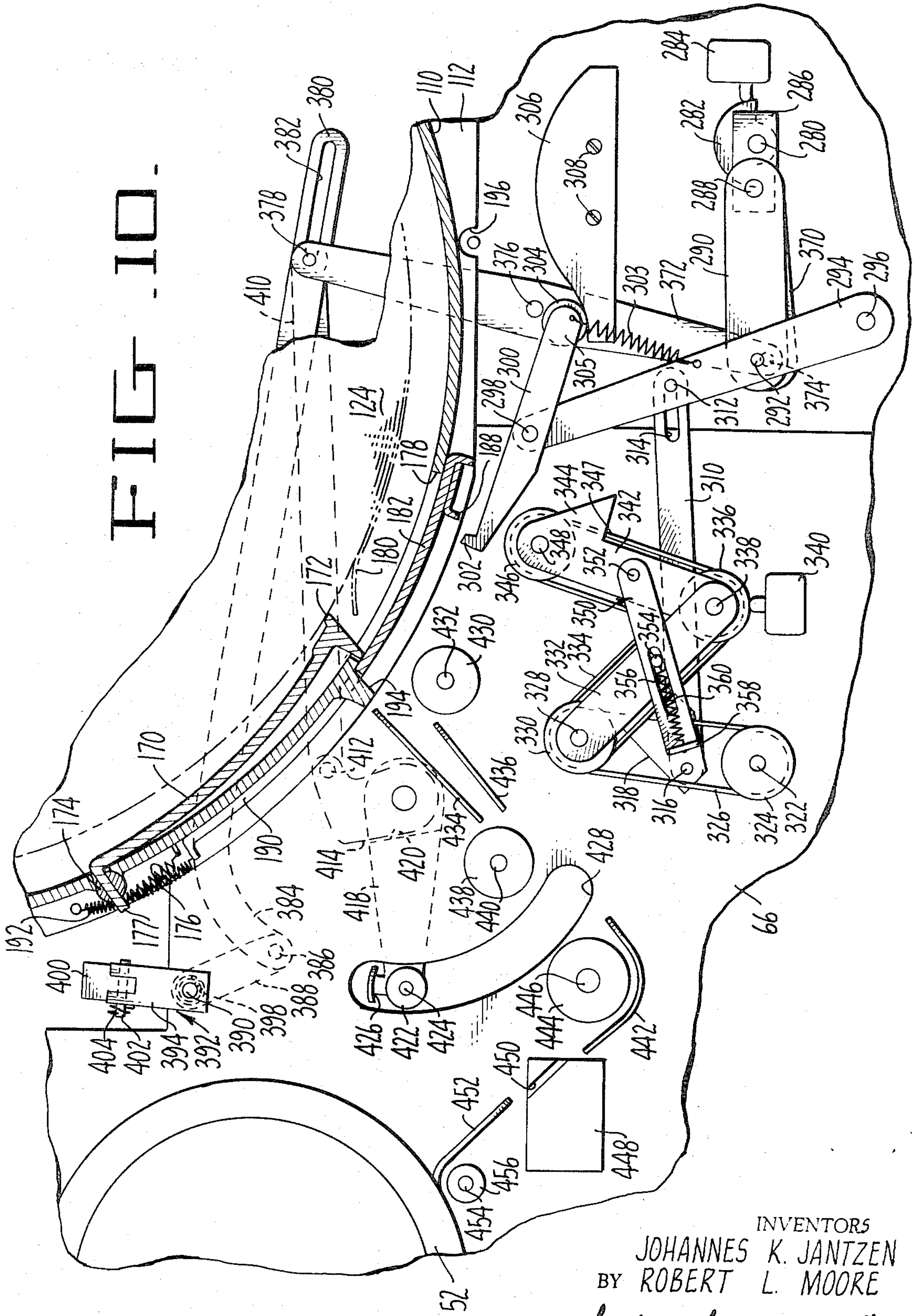
FIG. 10 is a broken away sectional view of a portion of the transport and magazine showing the magazine-side threading linkage assembly in its home position.
Figure 11:
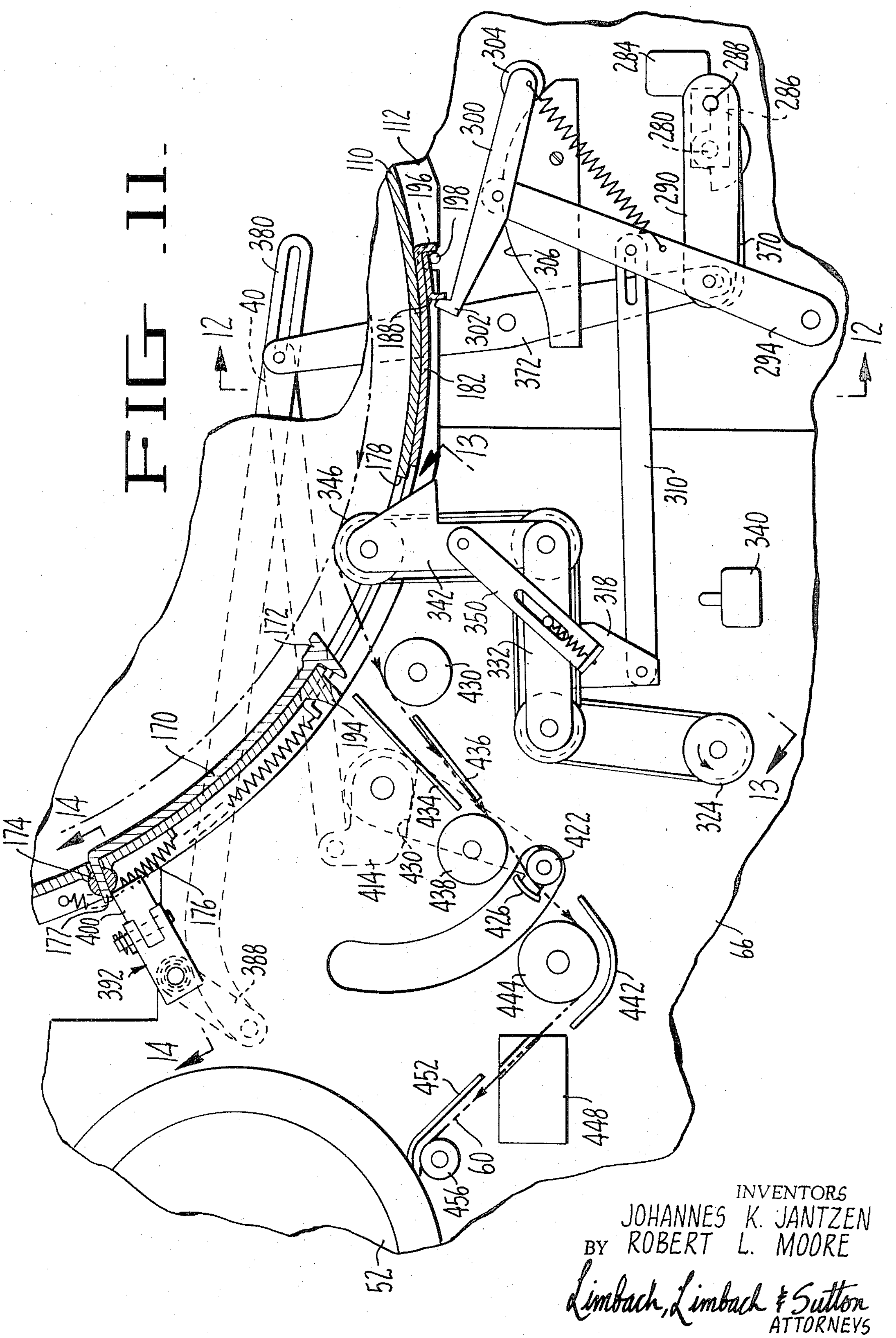
FIG. 11 is a view similar to FIG. 10 but showing the linkage assembly in its engaged position.
Figures 12, 13:
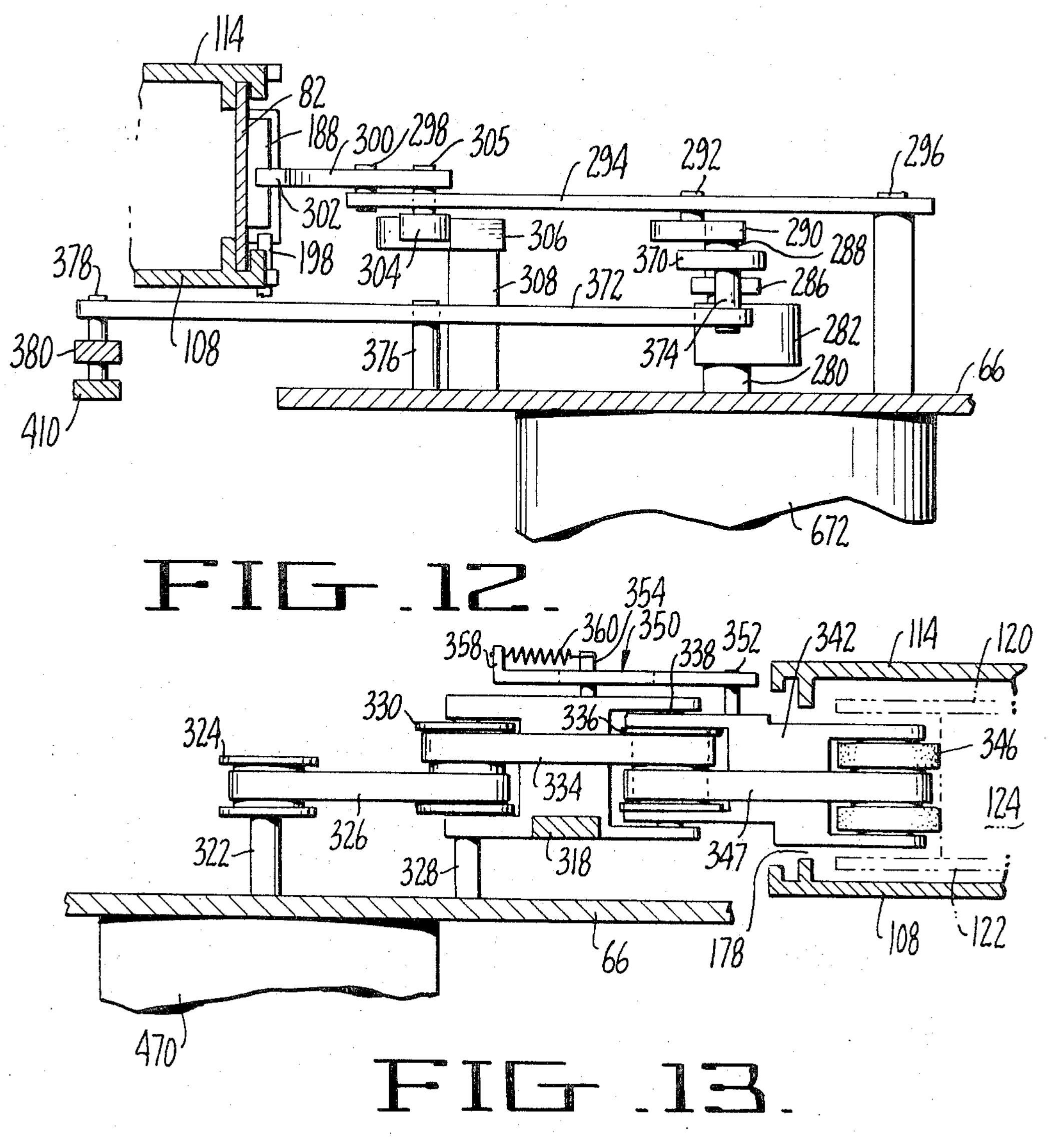
FIG. 12 is an elevation section view along lines 12—12 of FIG. 11.
FIG. 13 is an elevation section view along lines 13—13 of FIG. 11.

Referring now to FIGS. 10 and 11 wherein the magazine linkage assembly is shown in its home and engaged positions, respectively. A gear head motor (not shown) drives a shaft 280 having a semicircular cam 282 fixed thereto. Cam 282 is positioned so as to close a microswitch 284 during 180° rotation of the drive shaft 280. It is adjusted to engage the leading edge of the cam at the home position and to disengage the trailing edge of the cam at the fully engaged position. Shaft 280 drives a crank 286 which has a pivot 288 at the end thereof connected to a link arm 290. The far end of arm 290 is connected by a pivot 292 to a link arm 294 about one-third of the way from one end thereof. The end of arm 294 is connected to a fixed pivot point 296. The far end of arm 294 is connected by a pivot 298 midway along a hooked arm 300. The left end of arm 300 has a hook 302 for engaging ear 188 on the sliding door 182 of the magazine assembly. The other end of arm 300 has a cam follower roller 304 mounted thereto along with a spring 303 to pull the roller end of the arm in engagement with a cam 306. Roller 304 is mounted on a shaft 305. Cam 306 is secured to the transport by a set of screws 308 to cause the hook to match the back curve of the magazine door. A link arm 310 having a lost motion slot 314 is connected by a pin 312 midway along arm 294. The far end of arm 310 is connected by pivot 316 to an arm 318 that is secured to a portion of the puck drive assembly 320. Referring now also to FIG. 13, a puck drive motor 470 drives shaft 322 and drive pulley 324 fixed thereto. Pulley 324 drives belt 326 which in turn rotates a double idler pulley 330 mounted on a fixed post 328. An H-shaped arm 332 pivots on post 328 and carries a shaft 338 at the other end thereof on which a further pivoting arm 342 pivots. A double idler pulley 336 on pin 338 is driven by belt 334 to in turn drive belt 347 which rotates the tape drive pulley 346 mounted on pin 348 at the end of arm 342. Arm 342 includes a triangular tape guide portion 334 for encouraging the leader 180 to follow the proper path into the puck. Arm 318 from the linkage assembly is connected to arm 332 of the puck assembly. A spring biasing arm 350 is pivoted from pin 352 connected to arm 342. Arm 350 has a slot 356 in which a pin 354 fixed to arm 332 rides. A spring 360 is connected from pin 354 to the vertical end section 358 of arm 350. Spring arm 350 tends to rotate arm 342 clockwise to provide good contact with the leader 180 while permitting a variation in the diameter of the tape wound in the magazine. The elbow linkage is required for close proximity between stripper and puck to prevent leader buckle and yet avoid contact with the idler as the linkage swings.

Figure 14:
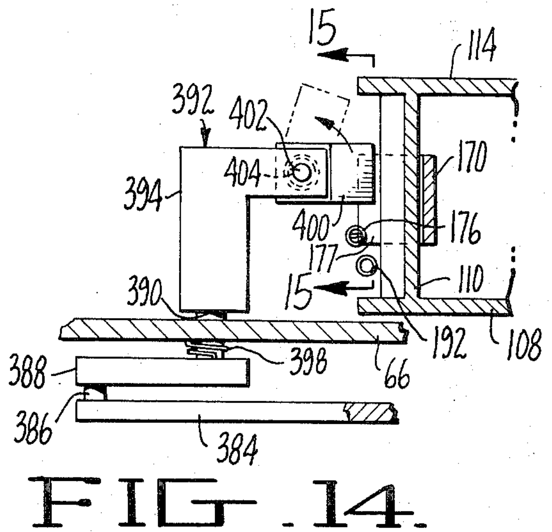
FIG. 14 is an elevation section view along lines 14—14 of FIG. 11.
Figure 15:
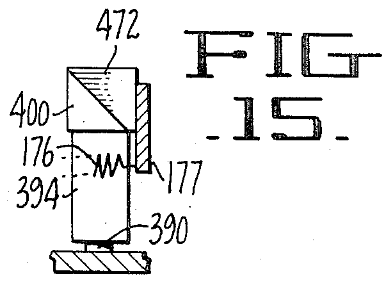
FIG. 15 is an elevation section view along lines 15—15 of FIG. 14.

Pivot 288 of crank 286 is also connected to a link arm 370 that is connected to one end of a rocker arm 372 by a pivot 374. The center of rocker arm 372 is pivoted at point 376 and the far end of the arm is connected by a pivot pin 378 to a slot 382 in link arm 380. The far end of arm 380 is curved along portion 384 for clearance purposes. The end 384 is pivoted at 386 to a link 388 which is connected to a hook assembly 392 by a pivot 390. Reference is made also to FIGS. 14 and 15 which show the hook assembly 392 in greater detail. Assembly 392 includes a main body portion 394 having an L-shape which tends to be rotated counterclockwise by a torsion spring 398. The end of body 394 has a flip-up hook 400 that hinges on a pin 402. A torsion spring 404 tends to urge the hook 400 downward. As the assembly is rotated clockwise by a link 388 the slanted face 472 of hook 400 rides over the end 177 of the scraper arm 170 so that it is positioned on the right-hand side of the end 177. Thus, when rocker arm 372 is rotated counterclockwise and pin 378 hits the end of slot 382, hook 400 will be pulled tightly against the end 177 of the stripper arm to pivot the stripper arm and move it away from the tape surface.

Pivot 378 is also connected to link arm 410 which is pivoted at its far end at pin 412 to an L-shaped arm 416 that fits into a clevis in tension arm 418. When link arm 410 is moved to the left, arm 414 rotates counterclockwise and the edge of arm 414 hits the clevis wall 420 to rotate arm 418. The end of arm 418 has a vertical shaft 424 and an idler tension pulley 422 mounted thereon. Also, an arm and guide plate section 426 are mounted to shaft 424. The ideer pulley and guide plate extend through the top plate 66 of the transport through a cut out slot 428.

Figure 16:
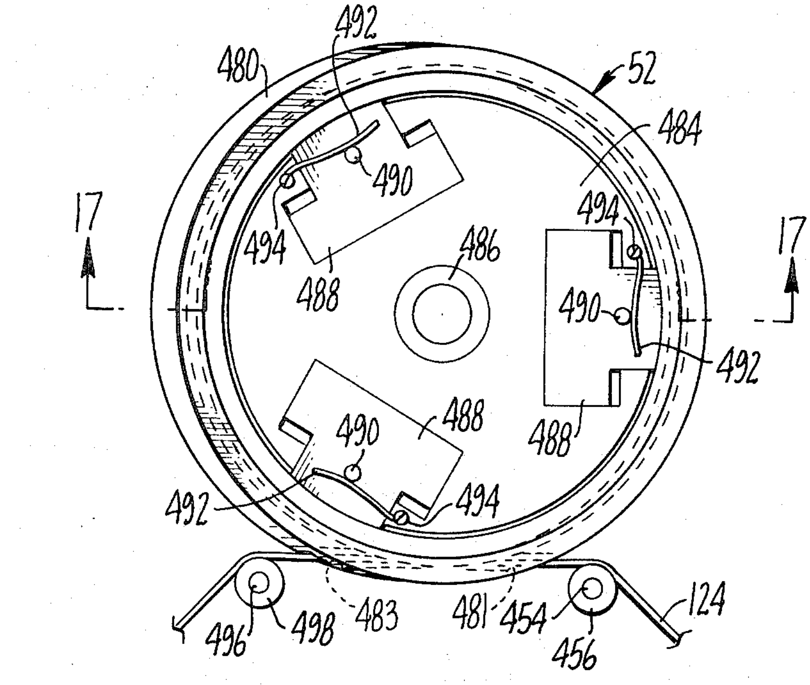
FIG. 16 is a sectional plan view of the helical scanning assembly.
Figure 17:
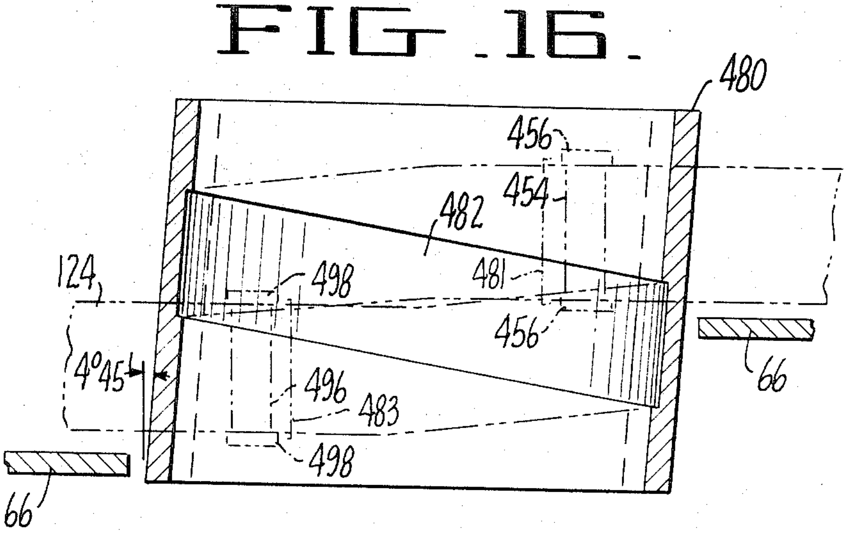
FIG. 17 is an elevation section view along lines 17—17 of FIG. 16.

Leader 180 driven out of the magazine by puck drive wheel 346 engages the end 172 of scraper arm 170 and the guide wall section 194 of the magazine side wall thereby directing the leader between a pair of guide chutes 434 and 436 pass idler 430 that is mounted on a shaft 432. The leader 180 is guided past idler 438 on shaft 440 between tension idler 422 and guide plate 426 to velocity tachometer idler 444 on shaft 446. Guide chute 442 takes the leader around a 90° turn to a slot 450 in the end of tape leader sensing device 448 that will be described further hereinafter. The leader leaves slot 448 and is directed by guide chute 452 around helical scanner tape guide (fixed) 454 having guide flanges 456 to direct the leader into the scanning assembly 52. ports Referring now to FIGS. 16 and 17 wherein details of the helical scanning assembly 52 and the tape guide sleeve 480 are shown. Tape 124 is received by ingoing fixed guide 454 having guide flanges 456. The tape is directed into a vertical slot 481 in to engage helical tape guide sleeve 480. The guide sleeve is not a right angle cylinder, but leans to one side at an angle of 4°, 45 minutes in order to fit over the helical scan drum and scanner disc which is disposed at the same angle. This angle may vary depending on the specific tape recording format and is to be considered exemplary only. Sleeve 180 has a spiral path cut 482 on its inner circumference; the width of the path is only slightly greater than the width of the tape and it is angled in such a manner that the tape edge rides on the upper edge of the path so that there is no vertical motion as the tape follows the guide path. A second slot 483 for exit from the guide sleeve is provided adjacent the output fixed guide 496 which has a pair of flanges 498. The input and output fixed guide and the vertical slots for entrance and exit of the tape are positioned to provide the desired tape wrap around the scanning assembly 52. It will be apparent that a guide sleeve may be provided for configuratons other than the $\alpha$ wrap as shown herein. The scanner assembly 52 includes a circular scanner disc 484 mounted on a drive shaft 486 connected to a two-speed motor (not shown) that rotates the disc at either 3,600 or 2,400 rpm. Three retracting heads 488 are mounted on the periphery of the disc; the heads are slidable radially. At the 2,400 rpm rotation speed the spring force provided by springs 492 mounted on post 494 press against pins 490 on the heads in order to retain them in a retracted position. At 3,600 rpm the centrifugal force (force varies as the square of the speed) is sufficient to extend the heads outward from the scanning disc so as toengage the tape as in conventional helical scanning assemblies. By operating the disc at 2,400 rpm damage to the heads may be avoided when the heavy leader is being threaded through the tape guide sleeve.

Figure 18:
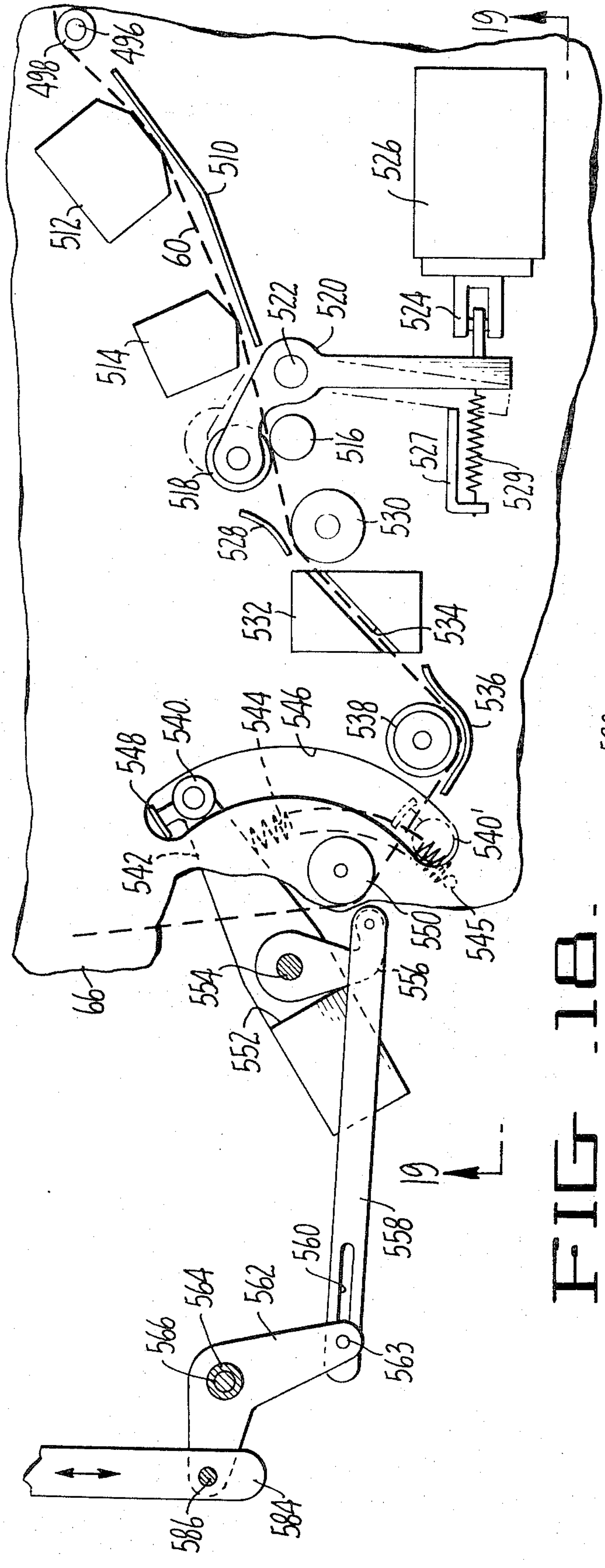
FIG. 18 is a broken away sectional plan view of the transport showing a portion of the fixed-reel side threading linkage assembly.
Figure 19:
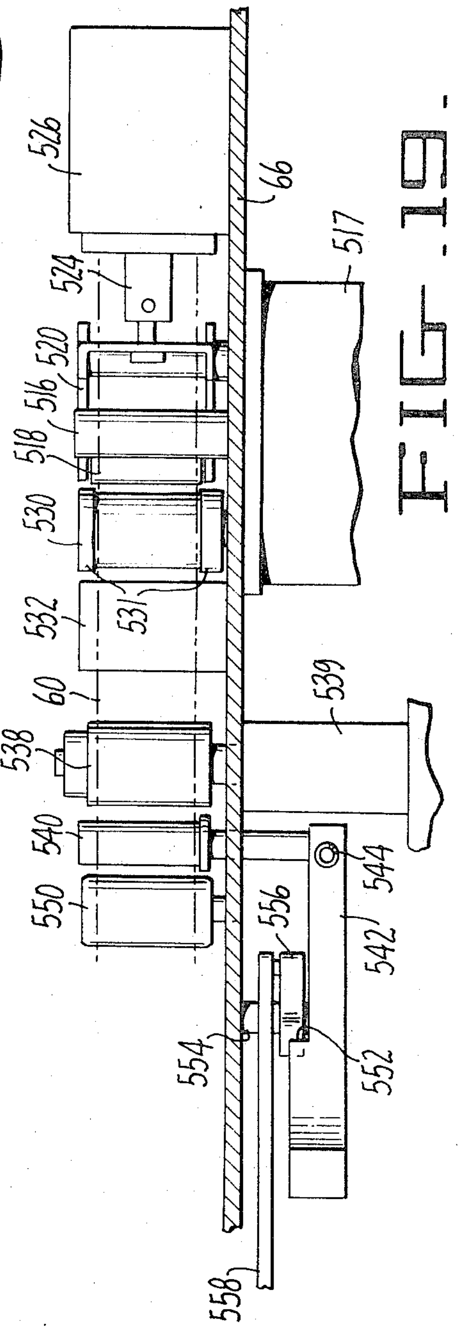
FIG. 19 is an elevation section view along lines 19—19 of FIG. 18.

Referring now to FIGS. 18 and 19 wherein the fixed reel linkage mechanism is shown. The tape threading path 60 from the output roller 498 of the helical scan assembly is directed past a pair of longitudinal heads 512 and 514 by a guide chute 510. Heads 512 and 514 can be used for address information or the like. The path extends past capstan 516 to guide chute 528 that directs the path over an idler 530. A pinch roller 518 mounted on an L-shaped arm 520 is pivoted at point 522 by a solenoid 526 and linkage 524. A member 527 acts as a stop for the end of arm 520 and as an anchor for tension spring 529 that pulls the pinch roller away from the capstan when solenoid 526 is not actuated. As explained further hereinafter, the pinch roller is initially not in engagement with the capstan 516.

Leaving idler 530, which has guide flanges 531, the tape path passes through slot 534 in a further leader sense device 532 and is directed around velocity tachometer idler 538 by a guide chute 536. The velocity tachometer 538 is connected to velocity tachometer 539 located below top panel 50. In the threading mode, the tension idler 540 is in position 540′ and the tape is directed to idler 550 by the guide chute 548 which is attached to the tension arm 542.

Tension idler 540 is rotated to position 540′ during threading when link arm 584 is pulled so that L-shaped link arm 562 pivots clockwise on bearing 564. The remaining end of arm 562 is connected to slot 560 of link arm 558 by a pin 563. The remaining end of arm 558 connected to L-shaped arm 556 that rotates clockwise against clevis wall 552 in the tension arm 542. Arm 556 is pivoted at pin 554. When the tension idler is not rotated to position 540′ by the linkage assembly, it provides a substantially constant force to provide tension on the tape caused by linear force spring 544 connected between the tension arm 542 and pin 545. The tension idler and guide chute 548 ride in cut out slot 546. The magazine assembly tension arm 418 is also provided with a linear force spring (not shown).

Figure 20:
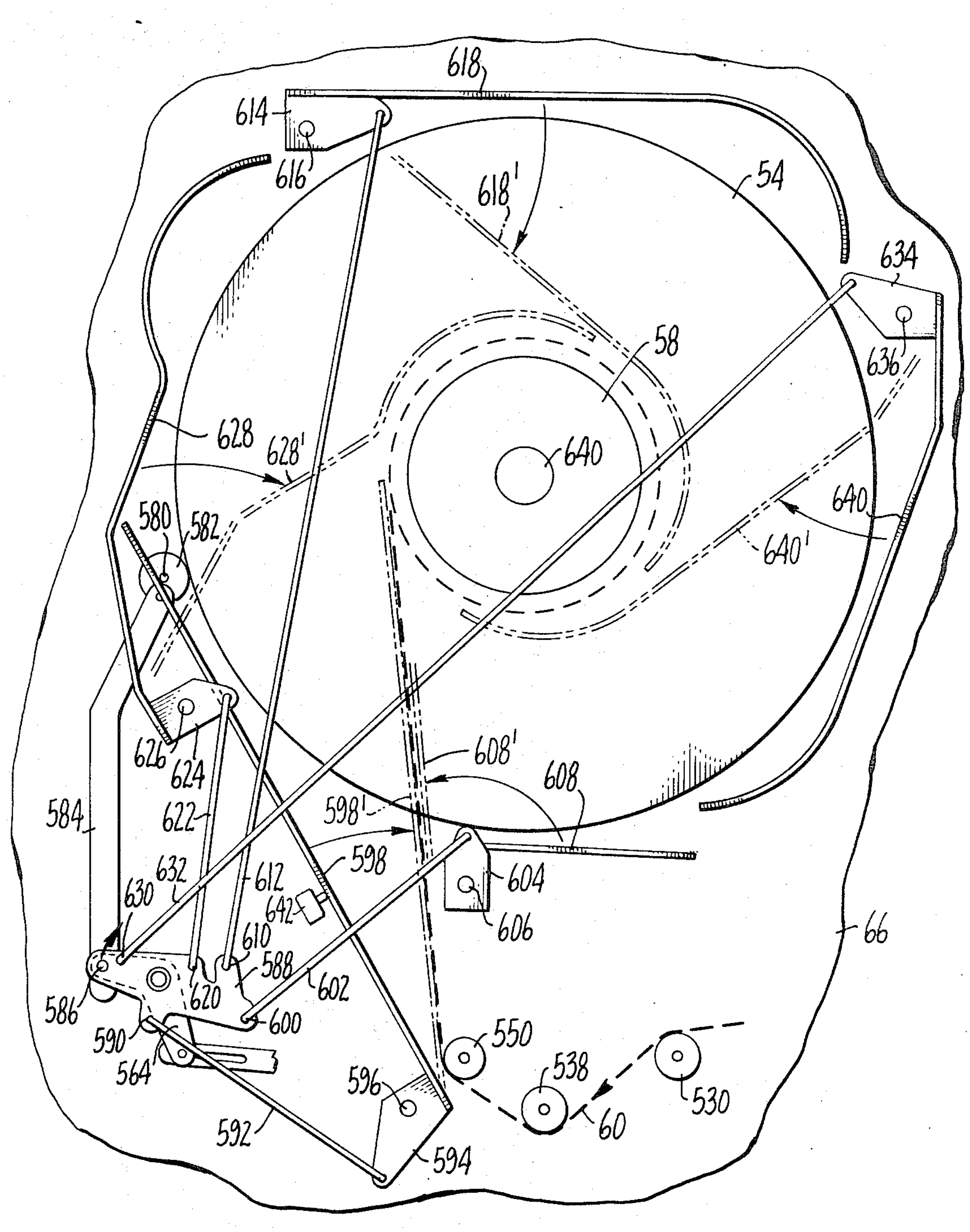
FIG. 20 is a broken away section plan view showing a further portion of the fixed-reel side threading linkage assembly.

Referring now to FIGS. 20 wherein further details of the fixed-reel linkage assembly are shown. A drive shaft 580 is connected to a gear head notor (not shown) and drives acrank disc 582 which has a link arm 584 connected to the periphery thereof. The far end of arm 584 is pivoted at 586 to the L-shaped arm 562 as shown in FIG. 18. A five-point arm 588 is connected to bearing 556 on shaft 564 and turns together with arm 562. A plurality of links controlling guide arms are connected to the five-point arm 588.

Link arm 592 is pivoted in hole 590 in the five-point arm 588 and is pivoted at one side of rocker arm 594. Arm 594 rotates on pivot 596 and has a straight guide arm 592 attached thereto for guiding the tape from idler 550 toward the reel hub 58. A microswitch 642 is closed when arm 598 is in its home position and it opens when the arm is pivoted toward the hub. A further link 602 is pivoted in aperture 600 of the five-point arm 588 and at the end of an arm 604 which is pivoted at point 606 in order to rotate a guide arm 608 to a position parallel and spaced from arm 598. Guide arm 608 and its linkage are optional and may be omitted if proper tape winding on the hub is achieved without the arm. A further link arm 612 is pivoted in aperture 610 on arm 588 and at one end of an arm 614 it pivots at 616. Arm 614 carries a curved guide arm 618. A further link arm 622 pivots in aperture 620 in arm 588 and at one end of arm 624 which pivots at 626. Arm 624 carries a leader guide arm 628. Yet a further link arm 632 pivots in aperture 630 of arm 588 and at one end of arm 634 which pivots at 636. Arm 634 carries a guide arm 638. When five-point control arm 588 rotates clockwise under control of link arm 584 and the gear head notor, the guide arms move into positions spaced from the hub 58 (shown in the prime positions) in order to guide the leader around hub 58. Arm 598, however, contacts the hub. Hub 58 is driven by a guide shaft 640 which is connected to a servo motor (not shown).

Figures 21, 22:
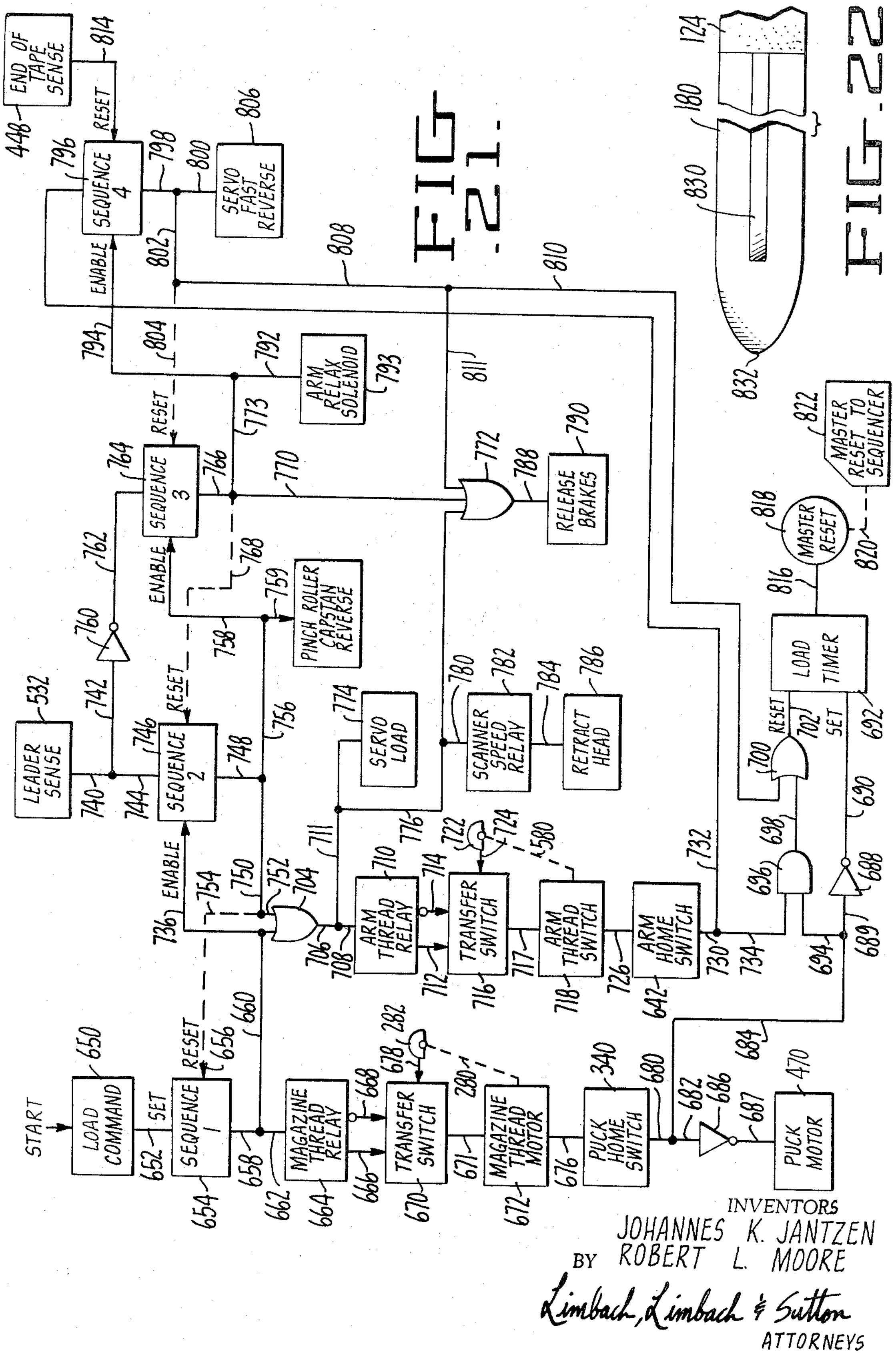
FIG. 21 is a block diagram showing the load sequence of the transport.
FIG. 22 is an elevational view of a portion of the tape leader.

The operation of the tape transport according to the present invention will now be described in connection with the foregoing drawings and also in connection with FIG. 21 which is a load sequence block diagram of the control logic of the transport and also in connection with FIG. 22 which shows the leading edge portion of the leader 180. Initially, the turn-table latch is in its up position, the magazine 102 is oriented with its curved side toward the curved side of the transport cover. The magazine is placed onto the hub/turntable assembly 134 and the magazine guide pin holes 154 and oriented to accept the guide pins. The latch 146 is depressed thus locking the reel 116 to the turntable platform 136 and breaking the dust seal. Several microswitches (not shown) located beneath the magazine assembly 102 in conjunction with microswitch 260 provide an electrical indication that the magazine is properly loaded. Upon pushing the load pushbutton in control panel 62 the load sequence is begun. Thus, a signal is provided on line 652 from the load command block 650. This signal provides a set input to the sequence 1 flip-flop 654. When sequence 1 flip-flop 654 is set, it provides a high output on line 658 which is connected to lines 660 and 662. The high input at line 662 to the magazine thread relay 664 energizes the relay to provide a high output on line 666 to transfer switch 670 to thus apply voltage to the magazine thread motor 672 that drives shaft 280. Shaft 280 has a semicircular cam 282 mounted thereon in order to close switch 284 and provide a signal on line 678 during the first 180° of rotation. When voltage is applied to the motor 672 the crank 286 begins turning the linkage mechanisms thereby causing the puck idler 336 to move off contact with microswitch 340 as the puck mechanism leaves its home position. As the puck home switch 340 opens, it provides a low signal on line 680 which is connected to line 682 and is inverted by an inverter 686 to provide a high signal to turn on puck belt drive motor 470. The low signal on line 684 is connected to lines 684 and line 686 where it is inverted by inverter 688 to provide a high signal to turn on puck belt drive motor 470. The low signal on line 684 is connected to line 684 and line 686 where it is inverted by inverter 688 to provide a high signal on line 690 to initiate timing in a load timer 692. Timer 692 begins a 20 second period, for example, after each time the thread sequence must be completed or it is aborted.

As the linkages are driven by crank 286, the tension arm idler 422 is brought to the bottom of channel 428, the puck 302 on arm 300 contacts ear 188 on the sliding door 182 and opens the door, and the puck drive idler 346 is swung in an arc into the magazine through the open door and begins to drive the reel 116. The leader 180 hits the stripper end 172 and is directed outward into the chutes and tape path. The swinging head mechanism 390 is rotated over the head 177 of the stripper arm 170 so that it is in position to withdraw the stripper arm when the arm 372 again rotates clockwise. At the end of 180° of rotation the magazine thread motor 672 is turned off as the cam 282 ceases to make contact with the microswitch actuator. The output on line 678 in FIG. 21 then goes low.

Meanwhile, the puck motor 470 continues to operate since the puck mechanism is not in contact with the puck home switch 340. The puck therefore drives the leader through the threading path and around the helical scan drum until the leader is sensed at the leader sense device 532. FIG. 22 shows the configuration of the laader tape 180: the end of the leader has a parabolic shape, for example, it may be a 1 inch by 1 inch parabola. Approximately 1 inch from the end of the leader a reflective strip 830 begins to run down the longitudinal length of the leader located approximately midway vertically. The leader is preferably a dull black so as to provide maximum contrast between the strip 830 and the leader surface 180. A leader thickness of 0.005 inches has been found to be optimum for self-threading. Leader sense device 532 contains a light source and a light detecting means (not shown). Leader sense device 448 is of substantially identical construction and is used to sense an end of tape marker Before explaining the threading operation after the leader is sensed, the left-hand or fixed reel mechanisms will be explained. Referring again to FIG. 21, there is also a high signal on line 660 due to the high signal on line 658 from the sequence 1 flip-flop 654. The high signal on line 660 is applied to line 736 to enable the sequence 2 flip-flop 746 and is also applied on line 661 to one input or an OR gate 704; thus, there is a high output on line 706 which is connected to line 710 and to line 708. The high signal on line 708 energizes the arm thread relay 710 to provide a high signal on line 712 to the transfer switch 716 thus providing a high signal on line 717 to provide voltage to the arm thread motor 718. Motor 718 in a manner similar to motor 672 has a semicircular cam 722 fixed to its shaft 580. The cam actuates a switch to provide a high signal on line 724 during 180° of operation. When motor 718 begins to turn it drives crank 582 so as to move the linkages and particularly arm 598 away from microswitch 642 to provide a high signal on line 730 which is connected to line 734 and 732. The turning of crank disc 582 causes the clamp arms 640, 618, 628, 608 and 598 to move in toward the fixed reel hub 58. At the same time, the linkages drive the tension arm idler 540 to position it at position 540'. After 180° of rotation the cam ceases to engage the microswitch and the signal on line 724 goes low and the transfer switch turns off the arm thread motor 718 leaving the arms inward.

When the leader sense device 532 detects the end of the leader, a high signal is applied on line 740 which is connected to line 742 and 744. Inverter 760 provides a low signal on line 762. The high signal on 744 results in a high signal on line 748 since the sequence 2 flip-flop 746 had been enabled by a high signal on 736. The high signal on line 748 provides a high signal on lines 750 and 752 to the OR gate 704 thus continuing a high signal at the output of the OR gate 706. The high signal on line 750 also provides a high signal on line 754 to the reset input 656 of sequence 1 flip-flop 654. The high signal on line 756 is connected to line 758 to enable sequence 3 flip-flop 764 and to engage the pinch roller 518 and to drive the capstan in reverse at 6.91 inches per second, for example, to drive the tape toward the fixed reel hub. At the same time the reset signal at 656 at sequence 1 flip-flop 654 causes a low signal on line 658 and 662 to the thread relay which deenergizes the relay and provides a high signal on inverted output 668 to turn on the transfer switch 670, which puts a high signal on line 671 to again turn on the magazine thread motor 672 which rotates 180° until the switch once again engages cam 282. As the motor moves through this second 180° rotation, the linkage mechanisms are moved so that the puck assembly is withdrawn to its home position thus closing switch 340 and disabling the puck drive belt motor and at the same time rocker arm 372 is rotated so that hook 400 presses against the end 177 of scraper arm 170 to move the scraper head 172 away from the tape surface. It will be noted that during the sequences following the outset of the load command at 650, that a high signal is present on line 710 thus causing the servo control of the fixed reel hub to operate at a slow loading speed while simultaneously providing a high signal on lines 776 and 780 to the scanner speed relay 782 which controls the speed of the scanner disc 484 so as to run it at 2,400 rpm to retract the heads. At the same time a high signal is provided on line 778 to OR gate 772 in order that the brakes connected to the drive shafts for the magazine and fixed reels are released (not shown).

The silver stripping on the leader 180 is, for example, about four feet long for the particular dimensions of one working embodiment of the present invention. After the leader has passed through the lead sense device 532 the absence of leader will be sensed and several control functions will simultaneously follow. A low signal is provided on lines 740, 742 and 744, thus a high signal on line 762 from the inverter is provided to the sequence 3 flip-flop 764. A high signal is thus provided on line 766 to lines 772, 770 and 792. The arm relax solenoid 793 is thus actuated to permit the tension arms to move freely under the control of the linear force springs. The high signal on line 768 resets sequence 2 flip-flop 746, thus providing a low signal on lines 748, 756 and 758 to return the capstan to its full speed and to move the pinch roller out of engagement with the capstan. Both inputs to OR gate 704 are now low, thus lines 706, 710 and 708 are low. The arm thread relay 710 is de-energized, thus providing a high signal on the inverted output line 712 to turn on transfer switch 716 and apply power to the arm thread motor again. The motor rotates until cam 722 once again applies a high signal on line 724 at which time the transfer switch turns off power to the arm thread motor. As the motor rotates the linkage mechanisms are moved so that the clamp guide arms return to their home positions. When guide arms 598 returns to its home position it actuates microswitch 642 to provide a high signal on lines 730, 732, and 734. There is a high signal on line 694 since the puck home switch 340 is closed, hence, AND gate 696 provides a high signal on line 698 to OR gate 700 which provides a high signal on line 702 to reset the load timer 692. The high signal on line 732 provides the high input to sequence 4 flip-flop 796 which has already been enabled thus a high signal is provided on lines 798, 800 and 802 and 804, causing the sequence 3 flip-flop 764 to be reset. The high signal on line 80 causes the servo drive to the fixed reel hub to go into fast reverse and unwind tape from the magazine onto the fixed reel hub. This action continues until the sensing device 448 detects the silver strip at the end of the tape thus providing a high signal on line 814 to reset the sequence 4 flip-flop 796 (or until a desired search address is found by circuits not shown here). The transport is now in a completely threaded and loaded condition. Should the load timer 692 time out prior to receipt of a reset signal on line 702, it will provide a signal on line 816 to master reset 818 to provide a signal on line 820 to master reset to sequencer 822 which resets each of the sequence flip-flops 1 through 4 to halt the threading procedure.

We claim:

1. A self-threading tape transport comprising
a locking hub/turntable assembly for holding a removable tape magazine,
means for confirming the presence and proper locking of a tape magazine,
means for leading out the tape leader from a tape magazine held by said locking hub/turntable assembly,
a helical scanner assembly,
means for guiding said tape leader to said helical scanner assembly,
a tape guiding sleeve encircling said scanner assembly for guiding said tape leader in a predetermined path around said assembly,
a take-up tape reel,
means for guiding the tape leader from
said scanner assembly to said take-up reel, and wherein said locking hub/turntable assembly comprises
a base member having a flared turntable portion for fitting within and engaging one side of a tape reel,
a sliding member slidably held by said base member,
spring means for biasing said members apart,
a slightly deformable spring member held by said base member,
a locking lever mechanism including a lever pivoted from said base member and having a cam operating against said deformable spring member for forcing said sliding member toward said base member and for locking said sliding member and base member together,
a pair of laterally extending fingers slidably held in said sliding member and spring biased inward, and
a camming surface in contact with said fingers for extending said fingers when said sliding member is forced toward said base member.

* * * * *